(12) United States Patent
Böhm et al.

(10) Patent No.: US 12,202,074 B2
(45) Date of Patent: Jan. 21, 2025

(54) METHOD FOR CUTTING A CONTINUOUS BATTERY ELECTRODE MATERIAL IN ORDER TO PRODUCE BATTERY ELECTRODES, AND A BATTERY ELECTRODE

(71) Applicant: VOLKSWAGEN AKTIENGSELLSCHAFT, Wolfsburg (DE)

(72) Inventors: Dennis Böhm, Wolfenbüttel (DE); Alexander Breuer, Celle (DE); Sven Rathmann, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 852 days.

(21) Appl. No.: 17/293,534

(22) PCT Filed: Oct. 22, 2019

(86) PCT No.: PCT/EP2019/078771
§ 371 (c)(1),
(2) Date: May 13, 2021

(87) PCT Pub. No.: WO2020/099076
PCT Pub. Date: May 22, 2020

(65) Prior Publication Data
US 2022/0001492 A1    Jan. 6, 2022

(30) Foreign Application Priority Data

Nov. 16, 2018    (DE) ........... 10 2018 219 619.2

(51) Int. Cl.
*B23K 26/38*    (2014.01)
*B23K 26/042*    (2014.01)
(Continued)

(52) U.S. Cl.
CPC ............ *B23K 26/38* (2013.01); *B23K 26/042* (2015.10); *B23K 26/0838* (2013.01); *H01M 4/139* (2013.01); *B23K 2101/36* (2018.08)

(58) Field of Classification Search
CPC .. B23K 26/38; B23K 26/042; B23K 26/0838; B23K 2101/36; H01M 4/139
See application file for complete search history.

(56) References Cited

U.S. PATENT DOCUMENTS 5,229,573 A * 7/1993 Stone ................. B23K 26/0665
                                                                    219/121.75
5,250,784 A    10/1993 Muller et al.
(Continued)

FOREIGN PATENT DOCUMENTS

CN        1199357 A    11/1998
CN     101777640 A    7/2010
(Continued)

OTHER PUBLICATIONS

International Search Report of PCT Application No. PCT/EP2019/078771, mailed Mar. 9, 2020.

*Primary Examiner* — Nathaniel E Wiehe
*Assistant Examiner* — Keith Brian Assante
(74) *Attorney, Agent, or Firm* — PEARL COHEN ZEDEK LATZER BARATZ LLP

(57) ABSTRACT

A method for cutting a continuous battery electrode material in order to produce battery electrodes includes providing a continuous battery electrode material and providing a transport device which is designed to move the continuous battery electrode material in a movement direction from a starting point to an end point over a machining region, wherein the transport device comprises at least two transport units. Additionally, at least one cutting device is provided. The continuous battery electrode material is then machined while being moved in the movement direction by means of (Continued)

the at least one cutting device such that at least one machining step is carried out on the continuous battery electrode material. At least one dimension of at least one of the at least two transport units is smaller than at least one dimension of the continuous battery electrode material at least in one region.

13 Claims, 2 Drawing Sheets

(51) Int. Cl.
*B23K 26/08* (2014.01)
*B23K 101/36* (2006.01)
*H01M 4/139* (2010.01)

(56) References Cited

U.S. PATENT DOCUMENTS

| | | | |
|---|---|---|---|
| 6,046,427 | A | 4/2000 | Richter et al. |
| 6,585,846 | B1 * | 7/2003 | Hanson ............ H01M 10/0404 |
| | | | 156/522 |
| 9,132,596 | B2 | 9/2015 | Wedekind et al. |
| 11,235,426 | B2 | 2/2022 | Watanabe |
| 2010/0024203 | A1 * | 2/2010 | Kim .................... H01M 4/1391 |
| | | | 29/623.1 |
| 2014/0020240 | A1 | 1/2014 | Masashi et al. |
| 2017/0069905 | A1 * | 3/2017 | Koike ................ H01M 50/406 |
| 2017/0148758 | A1 * | 5/2017 | Gaynes ................ B23K 1/0016 |
| 2017/0341163 | A1 * | 11/2017 | Mendoza ............... B23D 33/12 |
| 2018/0079035 | A1 * | 3/2018 | Watanabe ............. B23K 26/08 |
| 2019/0267606 | A1 * | 8/2019 | Lee .................... H01M 4/0433 |

FOREIGN PATENT DOCUMENTS

| | | |
|---|---|---|
| CN | 104942445 A | 9/2015 |
| CN | 106583947 A | 4/2017 |
| DE | 60104890 T2 | 8/2005 |
| DE | 10 2013 203 810 A1 | 9/2014 |
| DE | 10 2010 053 341 A1 | 6/2021 |
| JP | 2017 084691 A | 5/2017 |
| KR | 20140040126 | 4/2014 |
| KR | 20180095683 | 8/2018 |
| WO | WO 2015/124971 A1 | 8/2015 |

* cited by examiner

METHOD FOR CUTTING A CONTINUOUS BATTERY ELECTRODE MATERIAL IN ORDER TO PRODUCE BATTERY ELECTRODES, AND A BATTERY ELECTRODE

CROSS-REFERENCE TO RELATED APPLICATIONS

This application is a National Phase Application of PCT International Application No. PCT/EP2019/078771, International Filing Date Oct. 22, 2019, claiming priority of German Patent Application No. 10 2018 219 619.2, filed Nov. 16, 2018, which is hereby incorporated by reference.

FIELD OF THE INVENTION

The invention relates to a method for cutting a continuous battery electrode material in order to produce battery electrodes, and to a battery electrode.

BACKGROUND OF THE INVENTION

In the context of manufacturing batteries, individual battery electrodes are first manufactured and then, for a wide variety of battery types, these are arranged so as to form an assembly. Electrodes of this kind are produced, for example, by separating the battery electrodes from an electrode coil. Separation is often carried out by means of a cutting process, with machining using a laser cutting device being a possible alternative. Different approaches are already generally known from the prior art. Two approaches are presented in more detail in the following.

DE 10 2013 203 810 A1 discloses a method and a device for cutting an electrode strip. The electrode strip is provided for an energy storage cell; in a first method step, the electrode strip is transported through a laser cutting device and, during the first method step within the laser cutting device, a plurality of conductor lugs of the electrode strip are cut by means of a laser beam, the laser beam also being guided exclusively within the electrode strip in the first method step. In this case, there is no provision for a transport device that comprises at least two transport units, at least one dimension of at least one of the at least two transport units being smaller than at least one dimension of the continuous battery electrode material at least in one region, such that the battery electrode material can be freely machined in this region and/or between two transport units by means of the at least one cutting device.

WO 2015/124971 A1 discloses a cutting method. In particular, a cutting method is disclosed for cutting a continuous separator sheet material in a cutting zone contained between two non-rectangular electrodes using solid state laser apparatuses. A first cutting line is executed on the material, and this first cutting line is then intersected by a second cutting line at an intersection point that is arranged in an intermediate portion of the first cutting line, with an intersection direction that is perpendicular to the first cutting line at the intersection point. In this case, there is no provision for a transport device that comprises at least two transport units, at least one dimension of at least one of the at least two transport units being smaller than at least one dimension of the continuous battery electrode material at least in one region, such that the battery electrode material can be freely machined in this region and/or between two transport units by means of the at least one cutting device.

It is generally of interest, not just in the approaches presented, to steadily increase the cycle time when separating the battery electrodes from the electrode coil, in order to ultimately achieve a cost advantage. In particular, approaches to mechanical separation or laser separation of battery electrodes that are associated with a belt standstill ought to be avoided in the future. With mechanical separation, it is necessary for the belt to come to a standstill, since it is a contact-based cutting process. With laser separation, it is necessary for the belt to come to a standstill in order to prevent a transfer belt from being cut or to avoid generally poor cut edges. A belt standstill is also intended to prevent the transfer belt from being destroyed during laser separation. In this context, a cut gap in the system and bilateral suction are often required. In the manufacturing of electrodes, there is also a general interest in keeping waste as low as possible, since less waste ultimately also increases the efficiency of the production process. This can be achieved, inter alia, by reducing mechanical and thermal stress on the electrode coil during the cutting process. Improved quality of the cut edges per se also leads to less waste and thus to a reduction in manufacturing costs. With regard to the quality of the products to be created, the laser system used for current so-called on-the-fly cuts, which system uses a scanner and a conventional cut gap, is either too slow or too energy-intensive to produce a high-quality electrode cut edge. The scanner also has to cover a large machining region, and, as a result, the spot diameter is physically larger and therefore more energy has to be introduced into the active material layer. This also leads to a poorer cut edge, and therefore any quality defect that occurs can lead to increased waste. When laser cutting using a scanner, for example, a calculated cut gap for a medium-sized cell format of up to 100 mm is produced. This is possible under certain circumstances, but poses problems of substrate deflection. This in turn means that the substrate could lie outside the focal position, and therefore, in connection with this, a quality fluctuation can also occur.

SUMMARY OF THE INVENTION

The problem addressed by the invention is that of providing a method for cutting a continuous battery electrode material that can be used particularly efficiently and cost-effectively.

In a preferred embodiment of the invention, a method for cutting a continuous battery electrode material in order to produce battery electrodes is provided. A method of this kind comprises the following steps: providing a continuous battery electrode material, providing a transport device which is designed to move the continuous battery electrode material in a movement direction from a starting point to an end point over a machining region, the transport device comprising at least two transport units, providing at least one cutting device which is designed to machine the continuous battery electrode material, and machining the continuous battery electrode material by means of the at least one cutting device during a movement in the movement direction such that at least one machining step is carried out on the continuous battery electrode material, wherein at least one dimension of at least one of the at least two transport units is smaller than at least one dimension of the continuous battery electrode material at least in one region such that the battery electrode material can be freely machined in this region and/or between two transport units by means of the at least one cutting device. By means of the method presented, it is possible, as a result of the particular implementation of the individual steps, to achieve an increased cycle time when separating the battery electrodes from the battery electrode material. A reduction in the mechanical and thermal stress on the battery electrode material during the cutting process can also be achieved. These advantages can be realized in particular as a result of the dimensions selected in relation to one another, since this allows the battery electrode material to be freely and directly machined. A cost-effective method can thus be achieved particularly easily. Both positive and negative battery electrodes can be manufactured using the method presented.

In a further preferred embodiment of the invention, a battery electrode manufactured using the method according to the claims is provided.

The aforementioned advantages also similarly apply to the presented object, insofar as they can be transferred.

The term continuous battery electrode material is understood to mean that, although the material overall comprises more starting material for the production of battery electrodes than just for a single unit of production, it can ultimately represent a finite and self-contained unit. In other words, a certain amount of the continuous battery electrode material can be continuously provided in the method, so that a plurality of battery electrodes can be produced accordingly during a movement sequence.

Further preferred embodiments of the invention can be found in the other features mentioned in the dependent claims.

In a further preferred embodiment of the invention, the at least one cutting device is a laser cutting device comprising at least one laser cutting element. A laser cutting device comprising at least one laser cutting element is particularly suitable for ensuring an efficient and error-free cutting process. The individual laser cutting elements can, for example, be placed where direct and thus efficient machining of the continuous battery electrode material is provided. These advantages can be realized in particular as a result of the dimensions selected in relation to one another, since this allows the battery electrode material to be freely and directly machined. An improvement in the cut edge quality of a laser-cut battery electrode can thus be achieved, for example, by reducing the spot diameter of the laser element during the focusing. In addition, a low reject rate can thus be ensured, such that inexpensive production is also made possible.

In a further preferred embodiment of the invention, the continuous battery electrode material is provided in the form of a coil, wherein a material web of the coil is moved in a movement direction from a starting point to an end point over a machining region by means of the transport device and wherein the material web passes the at least two transport units in series during the transport process. The shape of a coil offers the possibility of providing the battery electrode material quickly and efficiently, for example in defined material webs, so that, according to the method steps presented, a cost-effective manufacturing process is made possible.

Furthermore, in a further preferred embodiment of the invention, the at least two transport units are provided in the form of conveyor belts, in particular vacuum belts, and the at least one dimension of at least one of the at least two conveyor belts and the at least one dimension of the continuous battery electrode material are each a width dimension, such that the continuous battery electrode material projects at least with one end of a broad side beyond the at least one conveyor belt. In other words, one conveyor belt is narrower than the battery electrode material, so that the conveyor belt, which is for example in the form of a vacuum belt, is not cut. The aforementioned advantages can thus be achieved even more effectively. In particular, damage to the transport units is avoided, so that a stable and efficient process is made possible, which can also be operated cost-effectively.

In addition, in a further preferred embodiment of the invention, the at least two transport units are provided in the form of conveyor belts, in particular vacuum belts, and the at least one dimension of at least one of the at least two conveyor belts is a width dimension and/or an internal dimension and the at least one dimension of the continuous battery electrode material is a width dimension and/or an internal dimension, such that the continuous battery electrode material projects at least with one end of a broad side beyond the at least one conveyor belt and/or at least in an inner region beyond the at least one conveyor belt. In this way, an electrode to be manufactured can be completely cut out during a movement process, for example using a transverse cut. Cutting on the transport unit can thus also be prevented in this machining step, so that damage to the transport unit caused by the cutting is prevented. A cost-effective method can thus be achieved even more effectively. In particular, if different laser cutting elements are used, each of which is provided for different machining steps, it is possible to cut in parallel at different points on the battery electrode material during the movement process such that an increased cycle time can be achieved, so that, in turn, cost-effective production is favored. An internal dimension can in this case be an inner connection between at least two points on the continuous battery electrode material and the relevant conveyor belt. In other words, in a further example this internal dimension could also be a particular surface area which is located within an outer boundary of the continuous battery electrode material or the relevant conveyor belt.

In addition, in a further preferred embodiment of the invention, the internal dimension of the at least one conveyor belt represents a substantially triangular shape of the conveyor belt in this region, wherein a tip of this shape is aligned counter to the movement direction substantially in the center of a broad side of the conveyor belt, or wherein a tip of this shape is aligned counter to the movement direction substantially at an edge region of a broad side of the conveyor belt. In so doing, a cut gap is kept small, so that a clean and high-quality cut edge can be achieved.

In addition, in a further preferred embodiment of the invention, the at least two transport units are provided in the form of at least two roller pairs, wherein the at least one dimension of the at least two roller pairs relates to an intermediate region between two adjacent rollers in the movement direction, wherein this dimension is smaller than at least one dimension of the continuous battery electrode material, such that the continuous battery electrode material can be freely machined in this region by means of the at least one cutting device. In this way, free machining in the form of a cutting process can be ensured in the intermediate region, so that a fast and thus efficient manufacturing method is made possible by means of the method presented. A cost-effective procedure in the production of battery electrodes can thus also be implemented in this embodiment of the method presented.

Moreover, in a further preferred embodiment of the invention, at least one sensor device comprising at least one sensor element is provided, which sensor device is designed to detect and align the continuous battery electrode material before and/or during a movement in the movement direction from a starting point to an end point over a machining region continuously and/or at least during a point in time, such that the continuous battery electrode material is aligned with respect to at least one transport unit and at least one machining step.

User-defined alignment by means of the sensor device can also ensure that a high cycle time is made possible, since the information generated by the device is available and can be used accordingly to control the process. In particular, the intended relationship between the aforementioned dimensions can thus be detected and maintained during the entire movement, so that it is possible to produce battery electrodes particularly reliably in terms of the aforementioned advantages.

Furthermore, in a further preferred embodiment of the invention, at least one suction device comprising at least one suction element is provided. In this way, the various machining steps can be carried out cleanly and thus reliably in order to ensure consistently high quality in the production process. Production residues, for example in the form of emissions (inter alia in the form of particles), which are produced during machining of the continuous battery electrode material and can occur as a result of a cutting process using a laser cutting device can thus be removed immediately, so that commonly occurring production residues or production by-products cannot not have a disruptive effect on the actual machining steps. A cost-effective method can thus be ensured even more effectively.

Moreover, in a further preferred embodiment of the invention, a feed rate of the continuous battery electrode material is used at least in part as a cutting feed rate. Individual machining steps in the form of processes of cutting the battery electrode material can thus be carried out even more quickly, so that cost-effective production can be achieved as a result of an increased cycle time.

Moreover, in a further preferred embodiment of the invention, a feed rate is set in a user-defined manner, in particular to a value of 10 m/s. With respect to the cutting processes, the method presented can therefore also be optimally designed for different battery electrode materials and the properties thereof, so as to provide high quality at the same time as maximum possible speed. It is therefore always possible to directly and immediately optimize the cost structure by means of the method presented.

Moreover, in a further preferred embodiment of the invention, a feed rate of at least two transport units in relation to one another is set in a user-defined manner, in particular is set to a substantially identical value. The method presented can thus be further optimized in terms of the advantages mentioned above. In particular, smooth and uniform clocking can be achieved at a high process speed, so that the production costs, for example in relation to a single battery electrode, can be kept low.

In a further preferred embodiment of the invention, the transport device is divided into at least two transport units, wherein the at least one transport unit is provided in the form of a conveyor belt, in particular a vacuum belt, and the at least one transport unit is provided in the form of at least two roller pairs. The method presented can thus be flexibly adjusted to the particular battery electrodes to be manufactured in the simplest manner possible, so as to allow end products to be manufactured cost-effectively.

Finally, in a further preferred embodiment of the invention, at least one further transport unit is additionally provided, wherein this further at least one transport unit is provided in the form of a conveyor belt, in particular a vacuum belt, and has a dimension which is based on a broad side and is equal in size to or greater in size than a dimension of the continuous battery electrode material, in particular a dimension based on a broad side of the continuous battery electrode material. This further transport unit can be provided, for example, at an end point of the machining steps, so that the manufactured battery electrodes can be transported away, for example to a further machining station or to a packaging station.

The method presented and the associated products can be applied or used in any battery cell applications, such as stationary storage, consumer batteries, etc.

Unless otherwise stated for an individual case, the various embodiments of the invention mentioned in this application can be advantageously combined with one another.

BRIEF DESCRIPTION OF THE DRAWINGS

The invention is explained below in embodiments with reference to the accompanying drawings, in which.

DETAILED DESCRIPTION OF THE INVENTION

Figure 1:
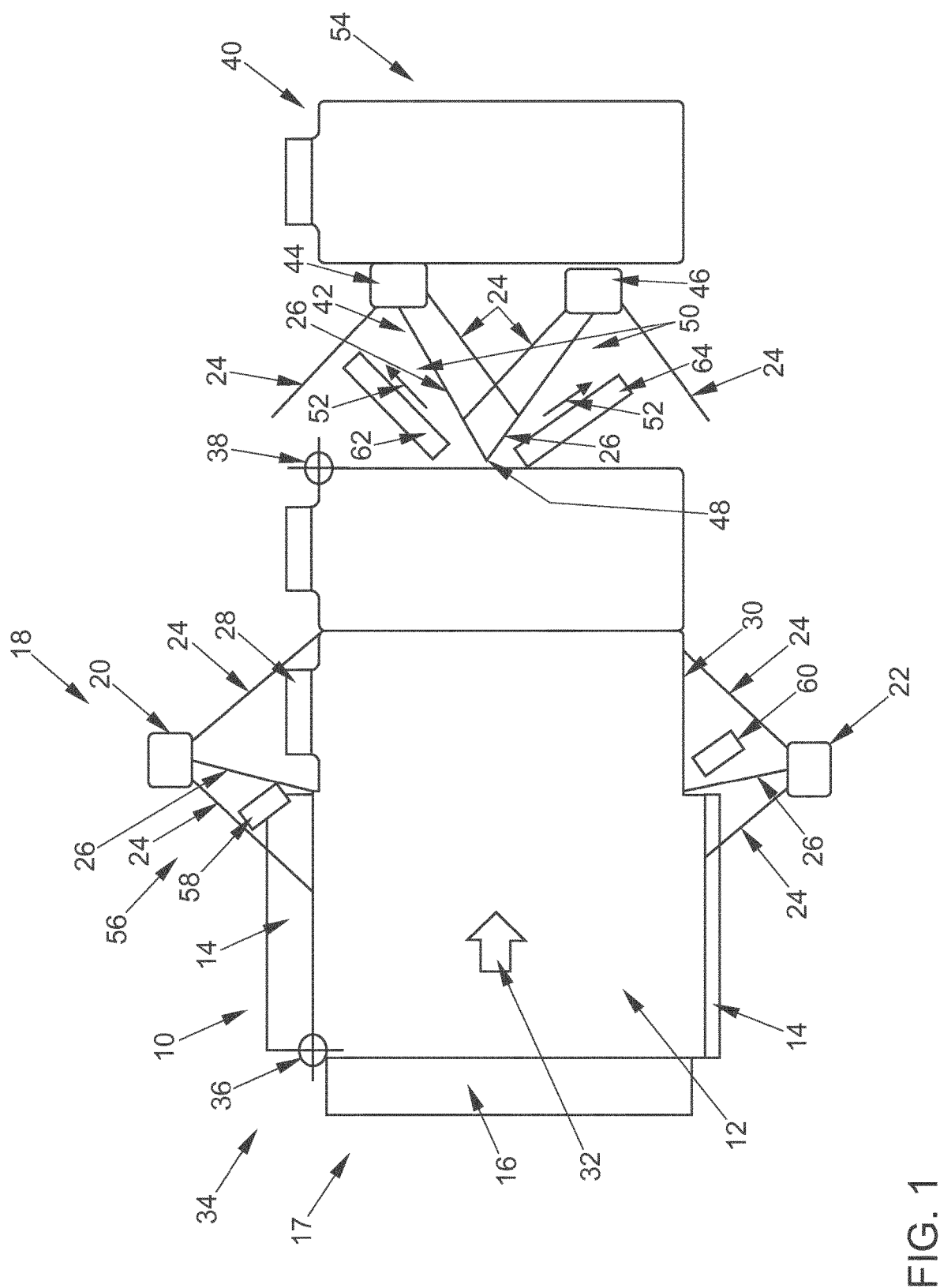
FIG. 1 is a schematic plan view of a continuous battery electrode material which is machined according to a presented method.

FIG. 1 is a schematic plan view of a continuous battery electrode material 10 which is machined according to a presented method. The continuous battery electrode material 10 has a coated region 12 in the middle and an uncoated region 14 on each outer side. In relation to the image plane, a first transport unit 16 in the form of a vacuum belt is shown on the left below the continuous battery electrode material 10. This first transport unit 16 is part of a transport device 17, with further components of this transport device 17 being presented below. In this plan view it can be seen that a width dimension of this first transport unit 16 is narrower than a width dimension of the continuous battery electrode material 10. In other words, the continuous battery electrode material 10 lying substantially centrally on the first transport unit 16 overlaps the respective edges of the first transport unit 16, such that the overlapping material can be freely machined there. In particular, free machining in the uncoated regions 14 and/or in a transition region between the coated region 12 and uncoated regions 14 can thus also be made possible, such that in this case a corresponding focusing of process parameters, for example in conjunction with the laser to be coupled in, can be ensured in a user-defined manner in terms of particularly high quality of the cutting process. For machining purposes, a laser cutting device 18 is shown which comprises two laser cutting elements 20, 22, one on each side of the continuous battery electrode material 10. The laser cutting device 18 is a special type of cutting device. The laser cutting elements 20, 22 each have a limited radius of action, which is shown schematically by auxiliary lines 24. Within this particular radius of action, the continuous battery electrode material 10 can be machined within the meaning of a cutting process, using a schematically illustrated laser beam 26. The laser cutting element 20 in this case cuts an upper electrode region 28 including conductor tabs and radii, and the laser cutting element 22 cuts a lower electrode region 30 to a corresponding target length including radii. A block arrow 32 also shows a movement direction of the continuous battery electrode material 10. In other words, the continuous battery electrode material 10 is moved from left to right in relation to the image plane by means of the first transport unit 16 in the form of a vacuum belt, so that, during this movement, corresponding cutting processes can be carried out according to the presented method by means of the laser cutting device 18 comprising the two laser cutting elements 20, 22. Furthermore, a sensor device 34 comprising a first sensor element 36 and a second sensor element 38 is shown schematically. The first sensor element 36 is provided in particular for web edge control of the continuous battery electrode material 10. For example, an upper face and a lower face can be monitored. The first sensor element 36 can be in the form of an optical sensor, for example. The second sensor element 38 is provided for detecting a transverse cut of the continuous battery electrode material 10. Ultimately, by means of the transverse cut, individual battery electrodes 40 are cut out from the already pre-machined continuous battery electrode material 10. According to the method presented, a second transport unit 42 is provided in this embodiment, which second transport unit has a substantially triangular shape with a tip oriented centrally counter to the movement direction. This second transport unit 42 can also be designed, for example, as a vacuum belt. At a broad end of the second transport unit 42 and correspondingly above the second transport unit 42, two further laser cutting elements 44, 46 can be seen, with further auxiliary lines 24 showing respective radii of action in the illustration shown. Laser beams 26 from each of the two laser cutting elements 44, 46 aim at a starting position 48 that is located substantially centrally on the approaching continuous battery electrode material 10. From this starting position 48, the two respective laser beams 26 then travel substantially parallel to the outer edges 50 of the second transport unit 42, with the cutting process not being carried out over the second transport unit 42 but instead on the overlapping region of the continuous battery electrode material 10. Movement arrows 52 indicate the particular course of the laser beams 26 from the laser cutting elements 44, 46. This tapered second transport unit 42 is advantageous because, during the so-called on-the-fly cut, it allows a cut gap to be kept small or allows the battery electrode 40 to be cut to be stabilized during the process. Alternatively, although not shown in greater detail, the vacuum belt could be inclined, in which case a tip would then point to an edge region of the continuous battery electrode material 10 to be selected. This is particularly favorable if only one laser or scanner is intended to be used for the transverse cut.

During the forward movement of the continuous battery electrode material 10, said transverse cut is thus made, so that ultimately respective battery electrodes 40 are cut out during an ongoing movement. These battery electrodes 40 can then be transported away via a further transport unit 54. As shown in FIG. 1, the further transport unit 54 is seamlessly lined up with the second transport unit 42. The further transport unit 54 has a width dimension which is the same size as a width dimension of the continuous battery electrode material 10, such that the finished cut-out battery electrode 40 can be transported further completely on the further transport unit 54. It is therefore conceivable for the continuous battery electrode material 10, for example in the form of a coil, while it is being cut by the laser cutting elements 44, 46, to be gripped by the cascaded second transport unit 42 or to be gripped in a central region of the continuous battery electrode material 10, and thus moved further in the movement direction. The coil feed can be used at least in part as a cutting feed. In the embodiment presented, the laser cutting device 18 is therefore used in such a way that different laser cutting elements 20, 22, 44, 46 are used in order to divide the different cutting processes between the relevant laser cutting elements 20, 22, 44, 46. The laser cutting elements 20, 22, 44, 46 can be provided, for example, in the form of scanning lenses. In addition, FIG. 1 shows a suction device 56 comprising a first suction element 58, a second suction element 60, a third suction element 62 and a fourth suction element 64. Overall, the suction elements 58, 60, 62, 64 are positioned such that they can be used as small and stationary suction means. The feed of the continuous battery electrode material 10 can be used as a cutting feed. Good suction results can therefore be achieved with low compressor outputs. The suction elements 62, 64 are in this case provided in a substantially elongate shape above the cutting region of the respective laser beams 26, so that, during the transverse cut, suction can be achieved as precisely as possible during the movement sequence. The transverse cut can also be referred to as an on-the-fly transverse cut. The battery electrodes 40 are therefore completely cut out without the belt coming to a standstill. The arrangement of the lasers and the associated scanner job split is advantageous since it allows the coupling processes to be minimized and the spot diameter to be reduced. The shown arrangements and geometries of the individual components to be used in the course of the method presented are only shown by way of example and can be varied accordingly within technically acceptable limits. The number of the particular elements shown in each case is also only shown by way of example, and further variants are also conceivable in this case. By means of the method presented, a wide variety of concepts can be implemented which also have a certain format flexibility owing to the reduced complexity (programming the scanners, without system conversion).

Figure 2:
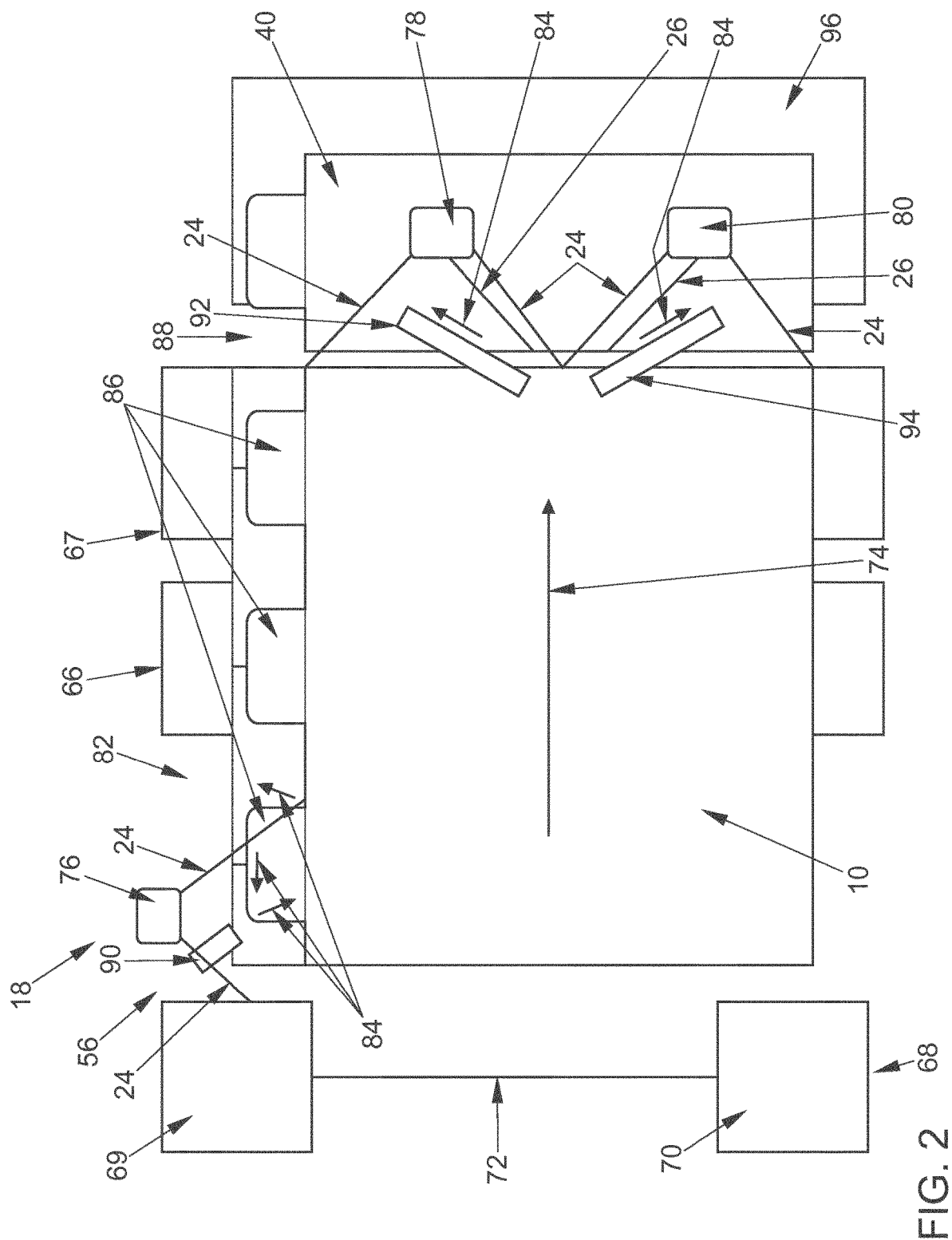
FIG. 2 is a schematic plan view of a continuous battery electrode material which is machined according to an alternative of the presented method.

FIG. 2 is a schematic plan view of a continuous battery electrode material 10 which is machined according to an alternative of the presented method. The continuous battery electrode material 10 in this case rests on two roller pairs 66, 67. On the left (in relation to the image plane) of the continuous battery electrode material 10, a further roller pair 68 is also shown, the individual rollers 69, 70 being connected by means of an axle 72. The continuous battery electrode material 10 is therefore moved from left to right and initially lies on the adjacent roller pairs 68, 66. The individual rollers 69, 70 (like the other rollers of the roller pairs 66, 67, 68) are each shown as being substantially rectangular, with the continuous battery electrode material 10 being placed in the middle such that, if the continuous battery electrode material 10 were still shown as resting thereon, a relevant outer region of the rollers 69, 70 could be seen in this plan view. According to a movement arrow 74 shown on the continuous battery electrode material 10, the continuous battery electrode material 10 is moved from left to right over the various rollers (for example by means of the various roller pairs 66, 67, 68). During this forward movement, corresponding cutting processes can be carried out by means of an illustrated laser cutting device 18 which in this case comprises laser cutting elements 76, 78, 80. The laser cutting element 76 in this case cuts the continuous battery electrode material 10 in an intermediate region 82 between the roller pair 68 and the roller pair 66. A radius of action of the laser cutting element 76 is shown by means of auxiliary lines 24. A laser beam 26 is shown schematically, with cutting movement arrows 84 indicating a rough route of the laser beam 26. The cutting movement arrows 84 and the movement of the continuous battery electrode material 10 from left to right in relation to the image plane ultimately result in the illustrated conductor tabs 86 and the associated radii. The laser cutting elements 78, 80, however, provide the transverse cut by means of their respective laser beams 26, so that ultimately a finished battery electrode 40 is produced. The radius of action of each of the laser cutting elements 78, 80 is again shown by means of auxiliary lines 24. The laser cutting elements 78, 80 also cut in a further intermediate region 88, so that free machining is possible. In this variant as well, a suction device 56 is provided which comprises suction elements 90, 92 and 94. The suction elements 90, 92 and 94 are in this case similar to those in FIG. 1. In particular, the suction elements 92, 94 are again shown as being slightly offset with respect to a horizontal image plane, so that constant suction can be achieved as close as possible to the cutting process in accordance with the resulting trajectory of the cutting process, which trajectory is composed of the laser movement and movement direction. In this case as well, cutting movement arrows 84 indicate an approximate direction of the particular laser beam 26. In FIG. 2, the battery electrode 40 which has already been cut out lies on a further transport unit 96, which is shown in the form of a vacuum belt. This further transport unit 96 is larger than the battery electrode 40 lying thereon. The shown arrangements and geometries of the individual components to be used in the course of the method presented are only shown by way of example and can be varied accordingly within technically acceptable limits. The number of the particular elements shown in each case is also only shown by way of example, and further variants are also conceivable in this case. By means of the method presented, a wide variety of concepts can be implemented which also have a certain format flexibility owing to the reduced complexity (programming the scanners, without system conversion).

LIST OF REFERENCE SIGNS

10 continuous battery electrode material
12 coated region
14 uncoated region
16 first transport unit
17 transport device
18 laser cutting device
20 laser cutting element
22 laser cutting element
24 auxiliary line
26 laser beam
28 upper electrode region
30 lower electrode region
32 block arrow
34 sensor device
36 first sensor element
38 second sensor element
40 battery electrode
42 second transport unit
44 laser cutting element
46 laser cutting element
48 starting position
50 outer edge
52 movement arrow
54 further transport unit
56 suction device
58 first suction element
60 second suction element
62 third suction element
64 fourth suction element
66 roller pair
67 roller pair
68 roller pair
69 roller
70 roller
72 axle
74 movement arrow
76 laser cutting element
78 laser cutting element
80 laser cutting element
82 intermediate region
84 cutting movement arrow
86 conductor tabs
88 intermediate region
90 suction element
92 suction element
94 suction element
96 further transport unit

The invention claimed is:

1. A method for cutting a continuous battery electrode material in order to produce battery electrodes, comprising the following steps:
   providing a continuous battery electrode material;
   providing a transport device which is designed to move the continuous battery electrode material in a movement direction from a starting point to an end point over a machining region, the transport device comprising at least two transport units, wherein the at least two transport units are provided in the form of conveyor belts;
   providing at least one cutting device which is designed to machine the continuous battery electrode material;
   machining the continuous battery electrode material by means of the at least one cutting device during a movement in the movement direction such that at least one machining step is carried out on the continuous battery electrode material,
   wherein at least one dimension of at least one of the at least two conveyor belts is smaller than at least one dimension of the continuous battery electrode material at least in one region, such that the continuous battery electrode material can be freely machined in this region and/or between the two conveyor belts by means of the at least one cutting device,
   wherein the at least one dimension of at least one of the at least two conveyor belts is a width dimension and/or an internal dimension and the at least one dimension of the continuous battery electrode material is a width dimension and/or an internal dimension, such that the continuous battery electrode material projects at least with one end of a broad side beyond the at least one conveyor belt and/or at least in an inner region beyond the at least one conveyor belt,
   wherein the internal dimension of the at least one conveyor belt represents a substantially triangular shape of the conveyor belt in this region, and
   wherein a tip of the substantially triangular shape is aligned counter to a movement direction substantially in the center of a broad side of the conveyor belt, or wherein a tip of the substantially triangular shape is aligned counter to the movement direction substantially at an edge region of the broad side of the conveyor belt.

2. The method according to claim 1, wherein the at least one cutting device is a laser cutting device comprising at least one laser cutting element.

3. The method according to claim 1,
   wherein the continuous battery electrode material is provided in the form of a coil, wherein a material web of the coil is moved in a movement direction from a starting point to an end point over a machining region by means of the transport device, and wherein the material web passes the at least two transport units in series during the transport process.

4. The method according to claim 1, wherein the at least two transport units are provided in the form of conveyor belts, and the at least one dimension of at least one of the at least two conveyor belts and the at least one dimension of the continuous battery electrode material are each a width dimension, such that the continuous battery electrode material projects at least with one end of a broad side beyond the at least one conveyor belt.

5. The method according to claim 1, wherein the at least two transport units are provided in the form of at least two roller pairs, wherein the at least one dimension of the at least two roller pairs relates to an intermediate region between two adjacent rollers in the movement direction, and wherein this dimension is smaller than at least one dimension of the continuous battery electrode material, such that the continuous battery electrode material can be freely machined in this region by means of the at least one cutting device.

6. The method according to claim 1, wherein at least one sensor device comprising at least one sensor element is provided, which the at least one sensor device is designed to detect and align the continuous battery electrode material before and/or during a movement in the movement direction from a starting point to an end point over a machining region continuously and/or at least during a point in time, such that the continuous battery electrode material is aligned with respect to at least one transport unit and at least one machining step.

7. The method according to claim 1, further comprising providing at least one suction device comprising at least one suction element.

8. The method according to claim 1, wherein a feed rate of the continuous battery electrode material is used at least in part as a cutting feed rate.

9. The method according to claim 1, wherein a feed rate is set in a user-defined manner to a value of 10 m/s.

10. The method according to claim 1, wherein a feed rate of at least two transport units in relation to one another is set in a user-defined manner, in particular is set to a substantially identical value.

11. The method according to claim 1, wherein the transport device is divided into at least two conveyor belts, and wherein each conveyor belt, comprises at least two roller pairs.

12. The method according to claim 1, wherein at least one further transport unit is additionally provided, wherein this further at least one transport unit is provided in the form of a conveyor belt and has a dimension which is based on the broad side of the conveyor belt and is equal in size to or greater in size than a dimension of the continuous battery electrode material.

13. The method according to claim 1, wherein the dimension of the continuous battery electrode material is based on a broad side of the continuous battery electrode material.

* * * * *